United States Patent [19]
Giles et al.

[11] Patent Number: 6,137,103
[45] Date of Patent: Oct. 24, 2000

[54] OPTO-MECHANICAL COMPONENTS

[75] Inventors: Clinton Randy Giles, Whippany; Lawrence Warren Stulz, Neptune, both of N.J.

[73] Assignee: Lucent Technologies, Murray Hill, N.J.

[21] Appl. No.: 09/127,187

[22] Filed: Jul. 31, 1998

[51] Int. Cl.$^7$ ...................................................... G01D 5/34
[52] U.S. Cl. .......................... 250/216; 359/227; 250/234; 250/227.11; 385/17
[58] Field of Search ..................................... 250/229, 221, 250/231.11, 231.12, 227.11, 227.21, 227.22, 227.23, 216, 234; 359/227, 230, 231, 232, 233, 234, 210; 385/15, 16, 19, 22, 17

[56] References Cited

U.S. PATENT DOCUMENTS

| | | | |
|---|---|---|---|
| 3,725,835 | 4/1973 | Hopkins et al. | 337/140 |
| 3,810,059 | 5/1974 | Jost | 337/25 |
| 4,189,206 | 2/1980 | Terai et al. | 385/20 |
| 4,477,724 | 10/1984 | Harmer | 250/227.22 |
| 5,440,654 | 8/1995 | Lambert, Jr. | 385/17 |
| 5,589,933 | 12/1996 | Osgood et al. | 356/73.1 |
| 5,946,840 | 9/1999 | Mickel | 42/70.11 |

*Primary Examiner*—Que T. Le
*Assistant Examiner*—Thanh X. Luu

[57] ABSTRACT

Opto-mechanical arrangements for use in light wave paths use actuator wires of a material, such as NiTi, whose length can be shortened by flowing heating current in the wire. The arrangements include switches and attenuator assemblies.

2 Claims, 3 Drawing Sheets

(a) Basic 1x2 Switch

PULL-PULL CONFIGURATION

MOVING ELEMENT

MOVING FIBER OR LENS ARRAY

OPTO-MECHANICAL COMPONENTS

FIELD OF THE INVENTION

This invention relates to opto-mechanical components, such as switches and attenuators that are useful in lightwave communication systems.

BACKGROUND OF THE INVENTION

In communication systems, there is a need for a switch that can controllably open or close a communication path or cross connect communication paths. In communication systems that use electrical signals for transmission, there is available a variety of such switches. Originally mechanical relay actuators were used for such switches and occasionally semiconductor devices are used for such switches. Characteristics sought for in all forms of switches are that they be rugged, reliable and relatively inexpensive.

There appears to be presently no switch for use in optical communication systems that has these characteristics of ruggedness, reliability and low cost to the degree desired.

The present invention seeks to provide such a switch. The invention further seeks to provide components for adding attenuation controllably to a lightwave communication path.

SUMMARY OF THE INVENTION

The present invention involves optical components that employ alloys, generally described as shape memory alloys, to form actuator wires that can be used to move physically a structural element to affect a gap between a pair of waveguides, such as optical fibers, either to switch or attenuate a lightwave passing in the gap.

Wires made of shape memory alloys have the property that when a current flows therethrough, it causes contraction of the wire for the duration of the current flow. At the termination of current flow and the resulting cooling, the wire returns essentially to its original length. Very low currents are adequate to heat a thin shape memory alloy wire to effect this change and so the effect can be fast, reliable, and amenable to closed-loop control. Moreover, the change in length of even a relatively short length of actuator wire can be used to physically move a pair of fibers in or out of coaxial alignment.

In one simple form, the invention is a 1×2 cross-connect switch that switches an optical path between an input fiber and selected one of a pair of output fibers. In a more complex embodiment, the invention is a non-blocking cross-connect N×N switch in which any fiber in the first array can be connected optically to any fiber in the second array. An N×N array of lenses and mirrors is used with an array of actuators to help direct the optical beams as desired.

By incorporating in one actuator wire, successive sections whose changes in length depend on successively higher levels of current flow, there can be formed an actuator wire that can be made to shorten its length in steps for use to provide a plurality of discrete shifts in direction of an optical beam.

Additionally, the invention includes attenuators that can be controllably inserted by an actuator wire in a lightwave communication path to introduce a desired amount of attenuation in the path.

The invention will be better understood from the following more detailed description taken in conjunction with the accompanying drawing.

DETAILED DESCRIPTION

Figure 1:
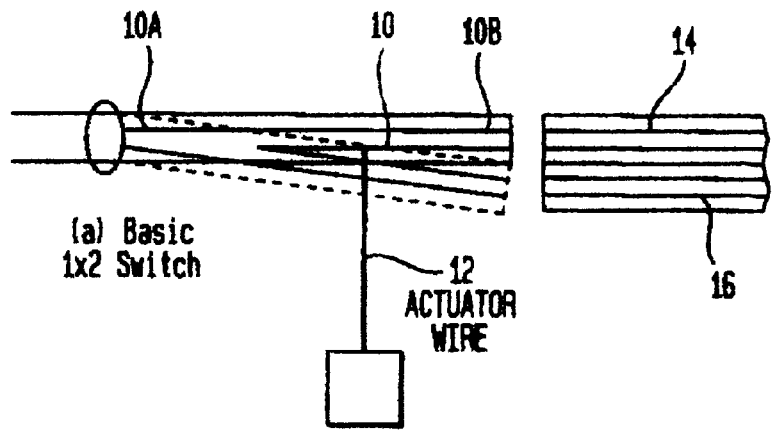
FIG. 1 illustrates a simple 1×2 lightwave switch in accordance with the invention.

FIG. 1 shows a basic 1×2 switch. It comprises a first flexible optical fiber 10 that has one end 10A that is fixed in position and its other end 10B movable. An actuator wire 12 of a shape memory alloy, advantageously of NiTi, has one end tied to an intermediate point of the fiber and its other end fixed. Passage of sufficient current through the actuator wire causes it to undergo a phase change that shortens its length, and such shortening shifts the movable end 10B of the flexible fiber 10 from a position 10A where it was coaxially aligned end-to-end with the adjacent end of fiber 14 to position 10B in coaxial alignment with the adjacent end of fiber 16. As a result, the fiber 10 that in its quiescent state formed an optical path with fiber 14 now forms an optical path with fiber 16. In an arrangement of the kind depicted in FIG. 1 with the two output fibers 14, 16 side by side, for 125 microns diameter optical fibers, and 4% shrinkage of the actuator wire, the required actuator wire length could be as short as about 3.1 mm. The ohmic resistance of a 3.1 mm length of 25 micron diameter NiTi wire is approximately 7 ohms, thus the power that is required to switch states is about 30 mW.

It should be apparent that it should be possible similarly to move instead the two fibers 14, 16 to align a selected one with the fiber 12 to form a transmission path with it.

Figure 2:
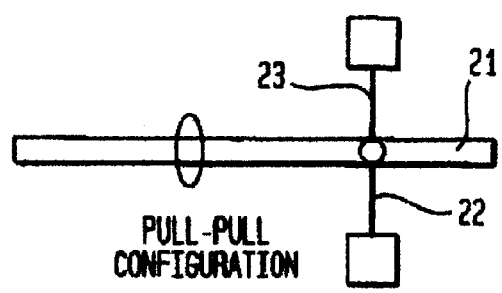
FIG. 2 illustrates a push-pull control configuration that can be made to latch in accordance with the invention.

A latching switch, in which an established connect state is maintained even after the control current is removed from the actuator wire, can be provided by arranging the restoring force to be insufficient to restore the moved fiber into alignment. This is made possible by the hysteretic properties of the shape memory alloys involved. In this case, to restore the switch to the closed position, in which the fibers are aligned end-to-end, the additional force needed to restore the switched fiber 21, when desired, can be provided by the additional actuator wire 23 connected in a push-pull arrangement with respect to the original actuator wire 22, as shown in FIG. 2.

Figure 3:
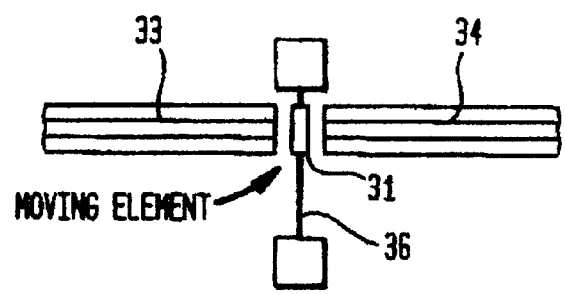
FIG. 3 illustrates an embodiment of the invention useful for inserting attenuation or an interruption in a lightwave path.

A simple open and closed switch 30 is shown in FIG. 3. In this arrangement, a shutter or interrupter 31 is moved in or out of a blocking position in the gap between the ends of coaxially aligned fibers 33 and 34. The position of the shutter 31 is controlled by the actuator wire 36 that is fixed at one of its two ends and is connected to the shutter for pulling it in or out of the blocking position as it changes in length. Alternatively, the shutter may be replaced by a partially transmissive plate to serve as an attenuator to add a desired amount of loss in the lightwave path.

From these examples, it should be apparent that the change in length of an actuator wire can be used to shift in position various other elements that can control the path of an optical beam. In particular, in addition to a shutter, other elements whose position can be shifted controllably to affect an optical beam include filters, lenses or other beam-affecting elements.

Figure 4:
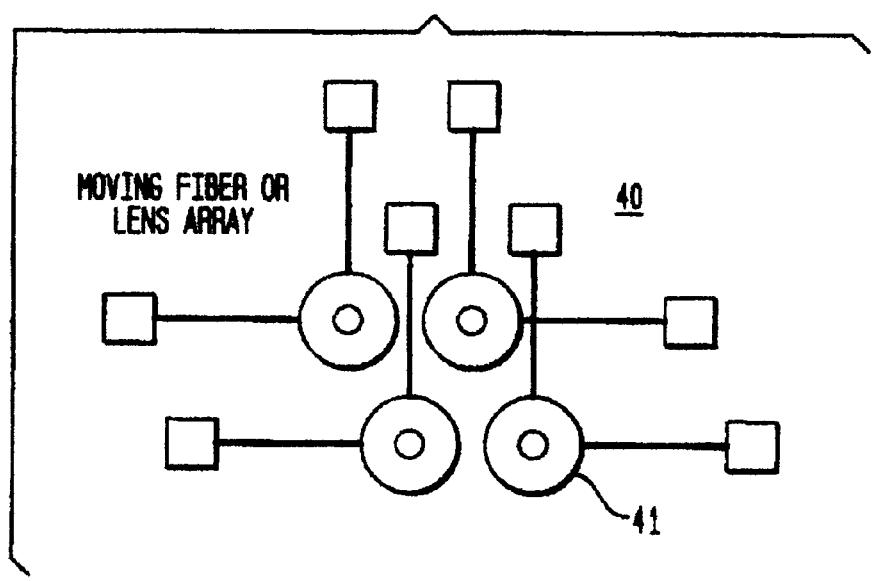
FIG. 4 is an arrangement for providing X–Y movement of a fiber for use in embodiments of the invention.

In FIG. 4 there is shown an arrangement by which an element that can affect an optical beam, such as a fiber or a lens 41, can be moved in either the X or Y direction simply by being connected to a pair of actuator wires, one for each of the X and Y directions.

Hitherto in this description there have been utilized actuator wires whose lengths were controlled by single valued currents. However, it is possible to position electrical taps along a single strand of wire to enable both digital and analog control of the strand's length. For example, a strand can be divided into sections of lengths 1, 2, 4 and 8 allowing 15 distinct changes of length. Then current taps are provided to the different sections to permit control currents to be added separately in each section whereby by contracting the lengths of appropriate sections, 16 different lengths can be realized by the full wire length. Continuous analog tuning of each section may also be done by fine-tuning the strand lengths.

Figure 5:
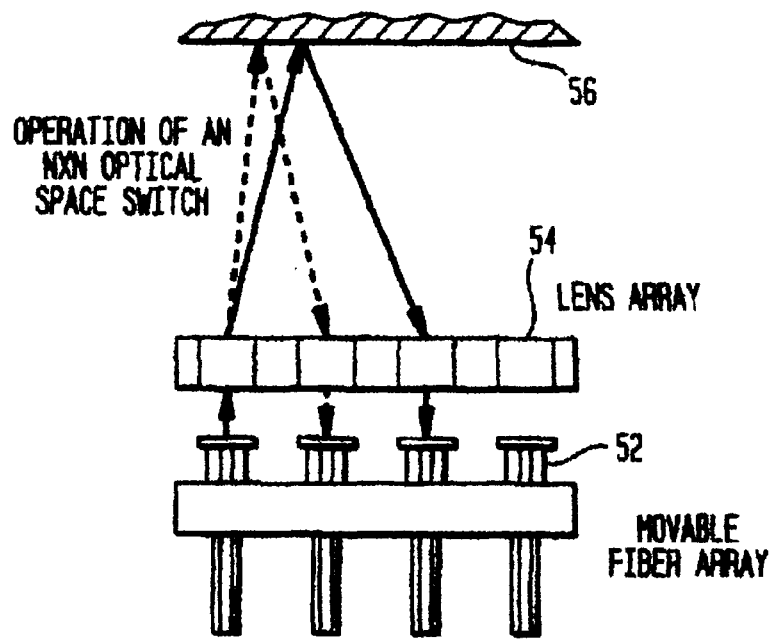
FIGS. 5 and 6 show top and side views of an N×N non-blocking switch in accordance with the invention.
Figure 6:
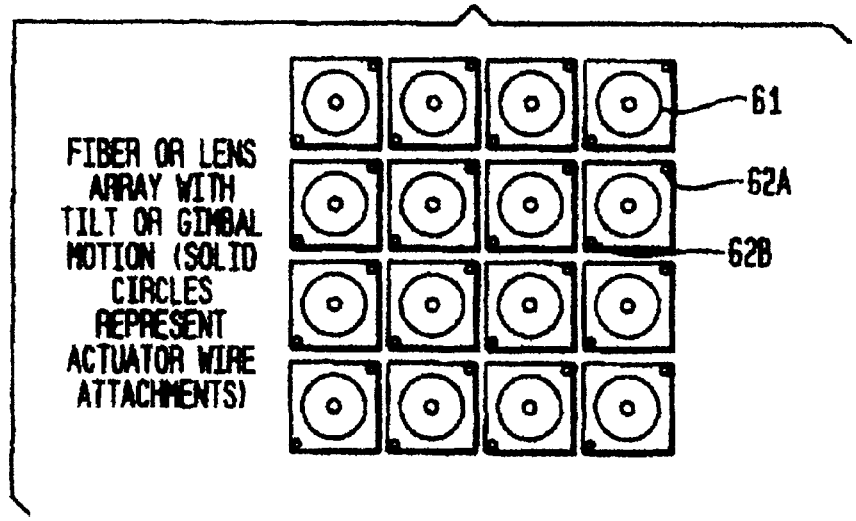

In FIGS. 5 and 6, there is shown an arrangement 50 that permits operation of a 4×4 switch utilizing actuator wires of the kind just described, including wires having sections of lengths 1 and 2 for permitting 4 distinct lengths as just explained.

In FIG. 5, there is shown a top view that shows a 4×4 array of optical fibers 52 and a 4×4 array of lenses 54 and a mirror 56. The fiber and lens arrays are aligned to associate each fiber with a different lens. Basically, interconnection between any two different fibers of the array is controlled by the reflection from the mirror of a beam traveling from a first fiber through its associated lens and reflection from the mirror for continued travel to a designated second fiber. The angle of incidence of a beam on the mirror and its angle of reflection from the mirror are determined by the tilt of either the first fiber or its associated lens, which are assembled on a tilt platform or gimbal stage. The tilt is controlled in both the X and Y directions by providing for either the first fiber or the associated lens a tilting arrangement of the kind shown in FIG. 6. Each lens 61 (or fiber) is mounted individually in a support that is provided at each of a pair of opposite corners 62A, 62B with an attachment to an actuator wire of the kind described, that for this application can have four different lengths. Each such wire is attached to provide that each fiber has associated with it an angle of incidence of its beam with the mirror to address any one of the other 15 fibers of the array. In some instances it may be desirable to include actuator wires to three or four corners of each support or to connect actuator wires to the supports of both fiber and lens to provide tilt of both fiber and lens. Multiple connections of such kinds can become more important as the size of the array is increased.

Figure 7:
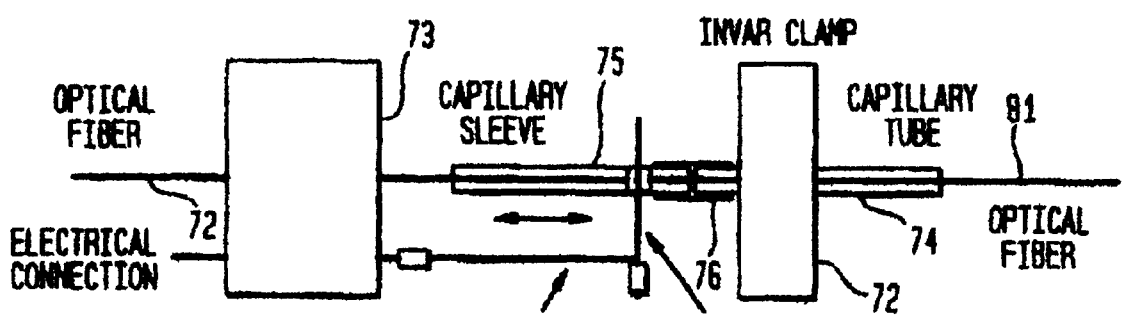
FIG. 7 shows an arrangement for inserting attenuation in a lightwave communication path in accordance with the invention.

FIG. 7 shows an arrangement 70 for the insertion of a variable amount of attenuation in a lightwave path. It comprises a frame 71, typically of ceramic or other temperature-stable rigid material that provides support for the various elements involved. An input optical fiber 72 is supported within an opening in a first part 73 of the frame. An output fiber 74 is supported at a second part 75 of the frame in coaxial alignment with the input fiber. The free ends of each of the fibers are enclosed within capillary tube portions 75 that serve as protective sleeves for the ends of the fibers. The two ends of the capillary tubes are aligned within a surrounding sleeve 76 that keeps the fiber ends coaxially aligned but permits sliding motion of the input fiber to vary the gap between the ends of the fibers. The width of the gap serves to determine the amount of attenuation inserted. One of the fibers, in the illustrative example the input fiber 71, is connected to a spring steel wire 78 that in turn is connected to the actuator wire 79. The contraction of the actuator wire is made to pull the spring steel wire 78 in a fashion to increase the width of the gap, and so the amount of attenuation introduced between the two fibers. Contraction of the actuator wire is controlled by a flow of current through the actuator wire between terminal electrical connections 80A and 80B.

Provision can be made, as discussed earlier, to use an actuator wire that is designed to provide various amounts of contraction. There results an attenuator that should be rugged, reliable and inexpensive.

Figure 8A:
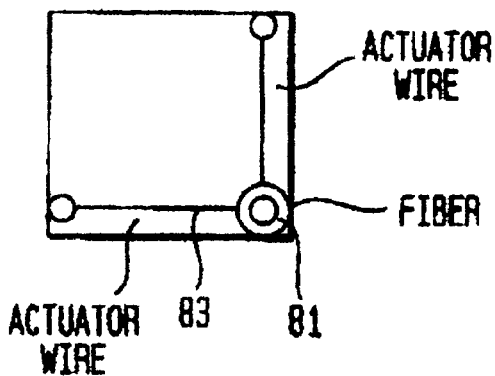
FIGS. 8A and 8B and 9A and 9B are top and side views of arrangements for using single wire actuators and balanced wire actuators, respectively, in embodiments of the invention.
Figure 8B:
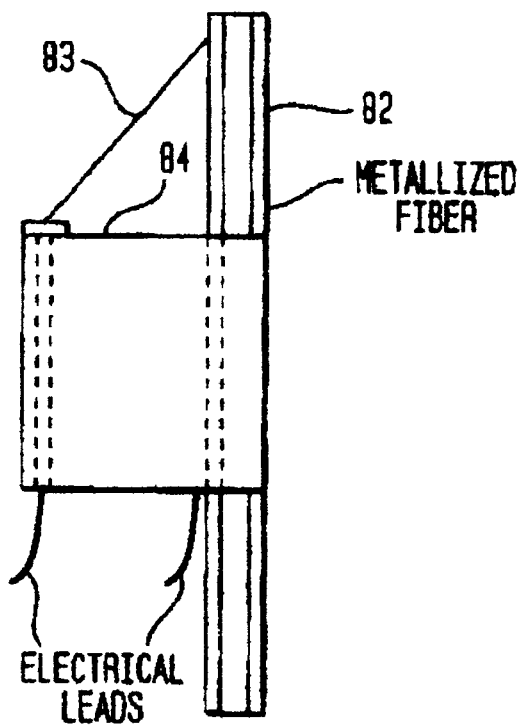

FIGS. 8A and 8B show in top and side views one possible arrangement for modifying either the tilt or position of a fiber 81 in the X and Y directions. The arrangement obviously can be modified to accommodate a lens in the same manner as the fiber.

As is seen in the side view FIG. 8B, over the cladding of the fiber 81, a metal layer 82 is provided that can serve as the return path of the separate control currents that are flowed through the actuator wires 83 and 84. To this end each actuator wire is soldered to the metal layer 82 at the movable end of the fiber. The actuator wires and the fiber are maintained in a desired position by the support member 84, which can be a simple sleeve that also includes provision for leads to supply the control current.

Figure 9A:
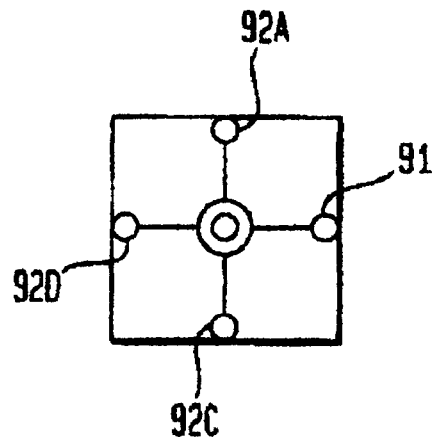
Figure 9B:
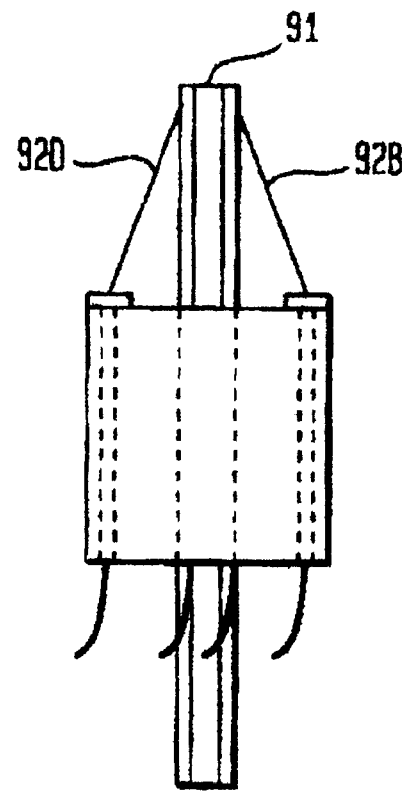

FIGS. 9A and 9B show a balanced arrangement for X–Y deflection or tilt of a fiber or optical element, such as a lens or mirror. In this case, the fiber 91 is centrally located as seen in FIG. 9A between four separate actuator wires 92A–92D as can be seen in FIG. 9B. By changes in the lengths of the wires, the desired deflection can be obtained. Again the cladding of the fiber can be metallized to provide a return path for each of the four actuator wires, each of which is connected for flow of its individual current.

In the drawing, the ends of the various fibers have generally been shown as straight-cleaved. In some cases, it may be desirable to angle-cleave the fibers in known fashion to reduce reflections as the beam traverses the gap. Anti-reflection coatings also can be used to minimize reflections.

In some instances, it may be desirable to insert arrangements more complex than simple shutters or attenuators in the gap formed between fibers aligned end-to-end, such as filters and lens assemblies.

A variety of functions should be feasible by variations in the basic arrangements described. In particular, the push-pull arrangement shown in FIG. 2 may enable a settable variable optical attenuator controllably to be included in the path of a beam traveling along an optical fiber.

As another possibility, if a feedback signal for the attenuation setting is required, two input fibers are moved simultaneously and with respect to their respective output fibers. Of these, one is used as a reference or auxiliary channel to provide an output signal that is then used to control the attenuation setting in the other, or main channel, the attenuator being a shutter that can block to varying degree the gap in the main path.

In such instances, it may be desirable to use memory alloy elements of the kind that have been described in combination with other linear actuators that provide some of the change in length needed to actuate the switching action, such as actuators using ordinary thermal expansion of materials, or bimetallic strips.

In the light of the foregoing, it should be evident that the specific embodiments that have been illustrated are merely exemplary of the basic principles of the invention and that other embodiments may be devised consistent with these basic principles. In particular, shape memory alloys other than NiTi can be used in fashions similar to those described. Similarly, instead of by optical fibers, the optical wave paths may be provided by waveguides of the integrated optics type in which a planar substrate of a first refractive index supports a thin linear stripe of different refractive index.

What is claimed is:

1. A non-blocking cross-connect N×N switch for interconnecting a sending optical fiber to a receiving optical fiber comprising:

an N×N array of optical fibers capable of sending and receiving optical signals;

an N×N array of lenses arranged so that a different lens is associated with a different one of the optical fibers of the N×N array;

mirror means positioned to reflect light exiting from a sending optical fiber by way of its associated lens to a selected receiving fiber by way of its associated lens;

and means including at least one separate pair of wires of a shape-memory alloy fastened to each lens of the array of lenses for tilting such lens appropriately under the control of current supplied to the pair of wires of the lens associated with each of the sending and receiving fibers for providing a continuous optical path between the sending and receiving fibers including the mirror means.

2. A non-blocking cross-connect switch in accordance with claim 1 in which each wire of said pairs of wires fastened to each lens comprises a plurality of sections, each section with a different shape memory for controlling the tilt of the lens in accordance with the magnitude of the current supplied to the wire.

* * * * *